United States Patent [19]

Robbins, Jr.

[11] 4,351,319
[45] Sep. 28, 1982

[54] RADIANT ENERGY TRACKER

[76] Inventor: Roland W. Robbins, Jr., 1020 Cheryl Ct., Ridgecrest, Calif. 93555

[21] Appl. No.: 67,283

[22] Filed: Aug. 17, 1979

[51] Int. Cl.³ .............................................. F24J 3/02
[52] U.S. Cl. ................................... 126/425; 126/424; 126/438; 126/439
[58] Field of Search .............. 126/425, 424, 438, 439, 126/440; 353/3; 350/289

[56] References Cited

U.S. PATENT DOCUMENTS

| 2,141,330 | 12/1938 | Abbot | 126/425 X |
| 4,027,651 | 6/1977 | Robbins, Jr. | 126/425 |
| 4,109,640 | 8/1978 | Smith | 126/425 |
| 4,138,993 | 2/1979 | Conley | 126/425 |
| 4,175,391 | 11/1979 | Baer | 126/424 X |
| 4,185,615 | 1/1980 | Bottum | 126/424 |
| 4,198,954 | 4/1980 | Meijer | 126/425 |
| 4,226,502 | 10/1980 | Gunzler | 126/425 X |

Primary Examiner—Larry Jones
Attorney, Agent, or Firm—Gerald F. Baker

[57] ABSTRACT

Apparatus for maintaining a radiation sensitive portion thereof in alignment with a distant source of radiation during relative movement between the situs of the apparatus and the source, wherein movement from alignment causes a differential in energy output in spaced apart elements of the radiation sensitive portion which is transformed into mechanical energy to return the portion to alignment.

3 Claims, 7 Drawing Figures

RADIANT ENERGY TRACKER

SUMMARY

The invention relates to a radiant energy tracking device and particularly to a device utilizing the radiant energy from a source such as the sun to provide a controlled energy output for maintaining a movable portion of the device in alignment with the source.

More particularly the apparatus is concerned with the conversion of radiant energy to mechanical energy for the purpose of keeping the movable portion of the apparatus in a desired position in relation to the source of radiant energy. It is a feature of the present invention that motive power for operating the device is derived from the radiant energy alone without utilizing any other source of external power.

The present invention is related to that disclosed in applicant's prior U.S. Pat. No. 4,027,651 containing background material which may be found of interest in understanding the instant device and the subject matter of said prior U.S. Patent is hereby incorporated by reference.

The disclosed invention is also illustrated in applicant's co-pending design application Ser. No. 22,694, filed Mar. 22, 1979 for Solar Water Heater, now U.S. Pat. No. D258,141.

DESCRIPTION OF THE SEVERAL VIEWS OF THE DRAWING

FIGS. 5a and 5b respectively are graphic illustrations of tracking apparatus according to FIG. 1 in boresight and non-boresight relationship to a radiation source; and FIG. 5c is a graphic illustration of a tracking apparatus according to FIG. 3 in non-boresight relationship to a radiation source.

DETAILED DESCRIPTION

Figure 1:
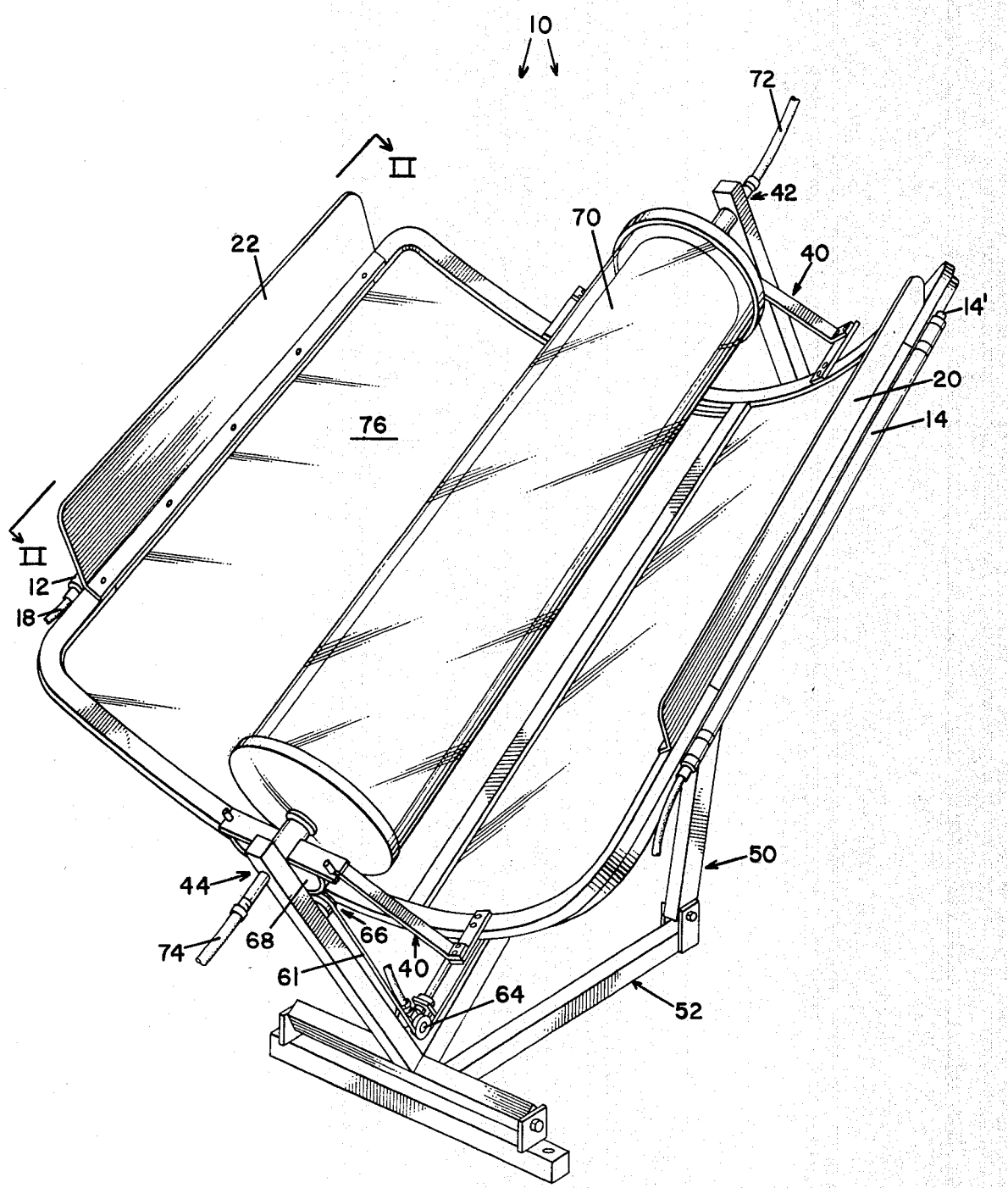
FIG. 1 is a perspective view of tracking apparatus according to the present invention in combination with a solar energy utilization device.
Figure 2:
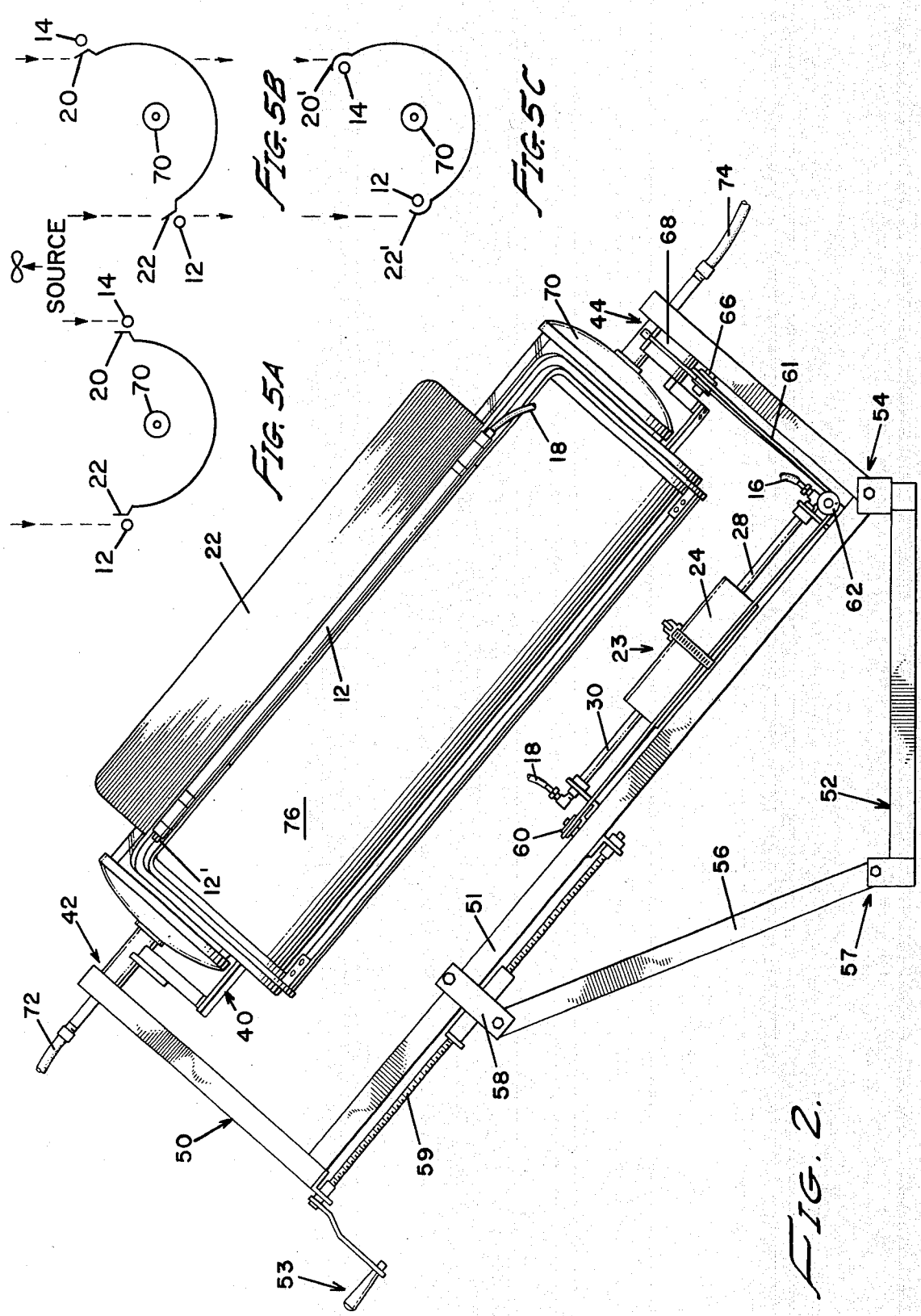
FIG. 2 is a side view of the apparatus as seen along line II—II of FIG. 1.

A tracker according to the present invention is shown in FIGS. 1 and 2 in combination with a radiant energy utilization device. The entire apparatus is indicated generally by the numeral 10.

Figure 3:
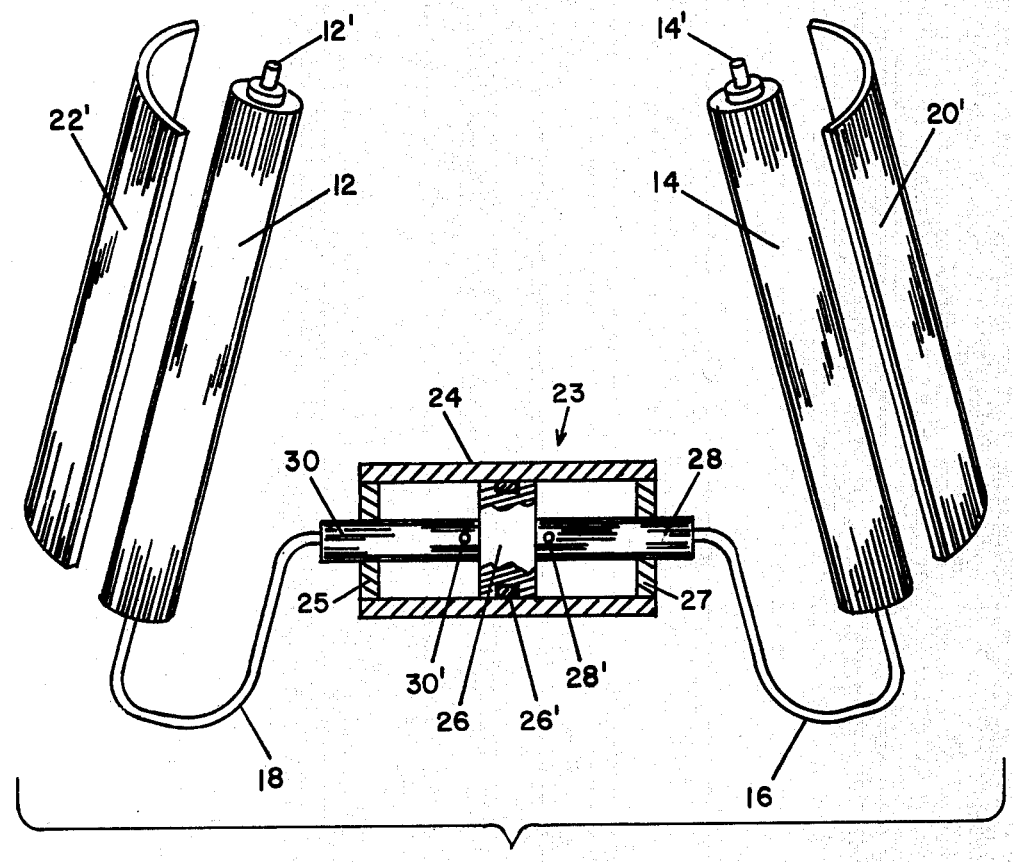
FIG. 3 is a simplified schematic representation, partly in section, of a second tracking apparatus according to the invention.

The tracker comprises two sensing elements in the form of tubular fluid reservoirs 12, 14 having filler plugs 12', 14' respectively at one end and conduit means 18 and 16 respectively at the other end providing for flow of fluid between the respective reservoirs and a fluid motor 23, better shown in FIG. 2 and 3. The reservoirs 12, 14 each has associated therewith a baffle means 22, 20 respectively to shade a portion of the reservoir from radiation.

The fluid reservoirs 12, 14 preferably contain a low boiling point working fluid such as Dichlorodifluoromethane (e.g. Freon 12) or ammonia with an ullage provided in each reservoir. A certain amount of oil may be mixed with the working fluid to enhance the sealing of the motor parts and to prevent the deterioration of sealing materials.

A form of fluid motor 23 is shown in connection with the embodiment shown in FIG. 3 wherein curved shading baffles 22', 20' are placed outside of reservoirs 12, 14.

The motor 23 comprises a closed cylinder 24 (see FIG. 3) having two integral end pieces, 25, 27 through which pass two hollow piston rods 28, 30. These rods are attached at one end to a piston 26 in cylinder 24 and fastened at their opposite ends to a fixed frame member 50 and are connected to communicate with respective ones of the conduit means 16, 18.

Figure 4:
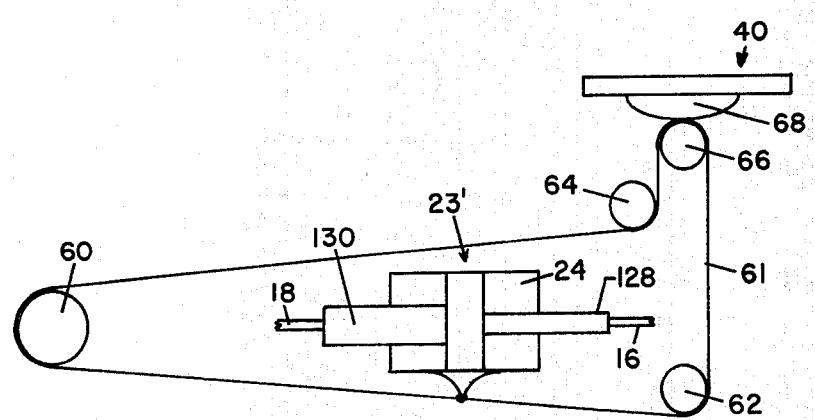
FIG. 4 is a longitudinal cross sectional view of a modified cylinder and piston arrangement usable with either tracking apparatus.

The hollow rods 28, 30 have orifices at 28', 30' respectively to complete the communication of fluid between the reservoirs and the respective sides of piston 26. The piston 26 and rods 28 and 30 are slidably fitted in their openings and may be fitted with conventional seals as indicated on piston 26 at 26'. A modified fluid motor 23' is shown in FIG. 4 characterized by hollow piston rods 128, 130 of unequal diameter.

The fluid reservoirs 12, 14 are positioned on either side of a movable frame member 40 which is pivotally mounted at points 42, 44 on a fixed frame 50. Flexible lines 16, 18 connect the reservoirs to the fluid motor which is attached to a longitudinal member 51 on the fixed frame 50. The motor is attached to the frame member by angle mountings attached to the outer ends of piston rods 28, 30. This allows the cylinder 24 to move relative to the rods and piston 26 when pressure changes occur on opposing sides of piston 26. Alternatively the cylinder could be attached to the frame and motion derived from one or both piston rods.

Attached to one side of cylinder 24 is a flexible belt or chain 61 which passes around pulleys 60, 62, 64 and 66. The periphery of pulley 66 is in contact with a sector 68 concentric with the pivotal axis of the movable frame.

The operation of the tracker, depends fully upon one simple and straightforward law of physics: For a saturated gas there exists only one unique vapor pressure for any given temperature. What this means to us is that if a reservoir is partially filled with liquid (such as Freon) the liquid will evaporate until it forms a vapor pressure above the liquid that is commensurate for the temperature that the system (system being liquid and gas) is at.

For example, the Freon that is used in the present system has a vapor pressure of 131 pounds per square inch at 100° F. If the Freon temperature is raised to 110° F. the pressure then goes up to 151 pounds per square inch. If two sealed tubes (e.g. reservoirs 12, 14) are filled with liquid Freon and one reservoir is at a temperature of 100° F. and the other at 110° F. a pressure differential of 10 psi will occur between the two. If we now connect a piece of tubing that goes from one reservoir to one side of an actuator and from the other reservoir to the other side, the actuator piston will be displaced toward the low pressure end. If a means is now devised to permit the motion of the actuator piston to null out the cause of the temperature differential one has the basis for the solar tracker. In this case, the motion of the actuator alters the position of the sunshades that changes the amount of radiant energy going to the individual reservoirs.

When radiation is directed from a distant point (see FIGS. 5a through 5c) towards the apparatus 10, other than at a preferred angular alignment with the reservoirs, the baffles associated with the reservoirs will act to prevent full radiation from being received by one of the reservoirs and allowing maximum radiation to be received by the other. This in turn, causes the working fluid within the heated reservoir to achieve a higher pressure than the cooler reservoir by virtue of the thermodynamic properties of the fluid. This results in unequal pressure within the respective fluid sub systems on either side of piston 26 and the cylinder 24 will move to effect movement of the frame 40 until the pressure again reaches equilibrium.

Obviously other fluid actuators may be used to effect movement of frame 40 or heat exchanger. Thus, a rotary or curvalinear actuator might be used in place of the linear motor shown. Frame 50 is pivotally mounted on a base frame 52 at pivot point 54 to facilitate the periodic angular positioning of frame 50 with respect to base 52. For this purpose a strut 56 is pivoted to base 52 at 57 and to a slide 58 threadedly mounted on an adjustment screw 59 so that slide 58 is free to move along frame member 51 and screw 59 when screw 59 is rotated by a crank 53.

The utilization device is shown as a fluid heater comprising a tank 70 mounted on movable frame 40 with its longitudinal axis coincident with the line of centers of pivots 42, 44. A fluid is caused to pass into and out of tank 70 by means of convection or other forces and conduits 72, 74 are provided for flow of the fluid to a utilization device, for example a swimming pool or heat exchanger.

A curved focusing reflector 76 is arranged on movable frame 40 such that radiant energy impinging on reflector 76 will be focused on a line coincident with or parallel to the pivotal axis of the movable frame.

The fluid system is completely flooded with a mixture of oil and dichlorodifluoromethane (Freon) except for the necessary gas ullage at the top portion of each reservoir. By flooding the actuator cylinder and all interconnecting lines any unwanted condensation of the Freon is avoided by virtue of the fact that a homogenous mixture exists throughout the system. The amount of fluid that the system is charged with must be such that at one extreme end of actuator travel there is some liquid remaining in the reservoir that is supplying liquid to the actuator cylinder. It is also important that the other reservoir, which is simultaneously receiving liquid from the actuator, does not become totally full with liquid. If this were to occur then the apparatus would stop working in that a hydraulic lock would exist. A sufficient gas ullage must be maintained at all times for the unit to function.

It has been found to be extremely helpful to make the fluid connection to the actuator through a tubular shaft that has a small hole drilled into it in a radial direction immediately adjacent to the piston face. The benefit of the hollow shafts is that one can secure the outer extremities of the shaft and extract the force and motion output from the actuator from a central location. This has proven to be convenient when trying to locate the actuator within a confined space. The benefit of the radial hole next to the piston is that this will allow almost a total purging of air from the actuator, during initial installation by simply cycling the actuator to the extremes of travel in each direction. This purging occurs regardless of the orientation of the actuator. On the other hand if the interconnect lines are attached to the cylinder or to the end caps it would be slightly more difficult to completely purge any entrapped air. A further benefit of the radially drilled hole in the rod is that by making the hole sufficiently small it will act as a restriction to the flow of oil. Such a restriction does not adversely affect the performance of the device, but it does assure against any unwanted motion caused by wind gusts against the apparatus. Also, the presence of an orificial restriction assures that the unit will not respond so rapidly that it will oscillate about its desired position. An additional benefit of the presence of the oil in the system is that it greatly inhibits fluid leakage past the shaft seals.

Once the sun goes down both reservoirs tend to cool off at about the same rate and to eventually achieve a uniform temperature equal to that of the surrounding environment. Once that condition is achieved the movable portion of the device simply continues facing West—the position that the sun last left it—until the sun appears in the East in the morning. At that time the reservoir on the sunrise side will become warm and thereby increase the vapor pressure of the Freon above that in the sunset evaporator thereby causing a slow rotation towards the East. At present this takes about one to one and one half hours. This is no real problem in that the sun is not hot enough on the collector to be of any real value until it is quite high in the sky.

It would, however, be nice to provide a means whereby the movable portion would slowly rotate to its Easterly direction throughout the night and be ready to receive the first rays of the morning sun. Several techniques could be used and may be worth mentioning.

If the two actuator rods are of unequal diameter, then the effective area n each side of the actuator will be different. This difference will cause a net force bias to occur when the pressure is equal on each side of the piston because force is the product of pressure times area. It is important to note that during the nighttime dormant period both of the reservoir tubes and the actuator will obtain an equal and uniform temperature for eight hours or more. During this time the above-mentioned force bias can effectively be used to slowly rotate the movable portion back to its starting position wherein it is ready to collect the first rays of the early morning sun. The difference in force bias is not sufficient to noticeably affect daytime operation because the rotation of the earth continually changes the attitude of the apparatus with respect to the source of radiation, the sun in this case, with resulting changes in temperatures sufficient to overcome any effects of the built-in force bias.

Another method for rotating the movable frame eastward during the night is to provide a means for inhibiting the heat loss from the sunrise evaporator so that it retains its sensible heat for a longer period of time than the sunset evaporator. The inhibiting means can be a special paint, or possibly another tube inserted within the reservoir tube, or whatever.

One could also use an electrical heating element on or within the sunrise reservoir to cause the eastward motion.

The possibility also exists for inserting within one of the reservoirs a substance that will store heat for a period of time (several minutes or several hours). This substance will delay the cooling off of the liquid in that reservoir and will therefore cause its vapor pressure to remain somewhat higher than that in the other evaporator. This will create a temporary pressure differential that can be used to cause movement toward the sunrise position. If the substance is one that undergoes a change of phase as from a solid to a liquid and back within the temperature range that the reservoirs will normally be operating in, then this technique may be quite viable. For instance Potassium melts at 144° F. and Sodium at 207° F. Alloys of Bismuth, Lead, and Tin can be combined in different percentages to yield a wide variety of melting points from 149° F. to 324° F. or thereabouts. The useful energy storing mechanism in each case would be the latent heat of fusion. It may take only a few ounces of any of these materials installed either in, or immediately around, one reservoir to create a sufficient temperature differential to drive the movable frame all the way to the Easterly most position.

A force bias created by means of a spring or mass would also be effective in rotating the movable portion toward the East during the night.

It has also been found that by leaving a small amount of air in the sunset reservoir it tends to compress as the device follows the sun to the Westmost position. Then after the sun sets, the compressed air exerts an unbalanced force against the fluid actuator thereby causing return motion.

It is also possible to dilute the Freon slightly in one reservoir with some other substance and thereby cause it to have a slightly lower vapor pressure than the reservoir containing pure Freon when they are both at the same temperature. This method will allow selective reduction of the vapor pressure in one reservoir such that when both reservoirs become uniformly cool after sunset a differential pressure would still exist and thereby cause movement toward the East.

The center of gravity of the movable portion is best placed somewhat below the line of pivots for a smooth motion.

It is, of course, obvious that the above described device can be used for a multitude of applications wherein it is desired to track a heat source (not necessarily the sun).

I claim:

1. Apparatus for tracking relative movement between a source of radiant energy and a distant object comprising:
   a relatively fixed portion;
   a relatively movable portion;
   at least two spaced apart radiant energy sensing elements on said movable portion capable of power output relative to the amount of said radiant energy received;
   baffle means associated with said sensing elements for interposition between said elements and said radiant energy source, depending upon position of said apparatus with respect to said source; so that
   when said apparatus is in a desired position with respect to said source, said elements receive substantially equal radiation from said source and, when said apparatus is not in said desired position, equal radiation is not received by said elements;
   means receiving the relative power output respectively of said elements and responsive to any power differential to position said movable portion relative to said fixed portion of said apparatus and to maintain a desired position between said movable portion and said source;
   said means responsive to power differential including;
   a hollow cylinder having integral end closures;
   a piston in said cylinder;
   first and second piston rods each attached by an inner end to a respective side of said piston and passing through said end closures;
   said cylinder being connected on each side of said piston for fluid communication with one or the other of said sensing elements;
   said piston rods being integrally fastened to one portion of said apparatus and said cylinder being mechanically linked to the other said portion; and
   said piston rods being of different diameters to provide a means effective to move said relatively movable portion to a predetermined position with respect to said relatively fixed portion when radiation from said source is completely shaded from said elements.

2. The device of claim 1 wherein said piston rods are hollow, each having at least one small opening near the inner end thereof and being connected at their outer ends respectively with one or the other of said sensing elements.

3. The device of claim 1 wherein said piston rods are hollow with openings near the inner ends thereof to provide said fluid communication.

* * * * *